W. H. FULTON.
MANUFACTURE OF TIRES.
APPLICATION FILED NOV. 20, 1919.

1,393,998. Patented Oct. 18, 1921.

Inventor
W. H. Fulton
by Kerr, Page, Cooper & Hayward, Attys

UNITED STATES PATENT OFFICE.

WILLIAM H. FULTON, OF IRVINGTON, NEW JERSEY.

MANUFACTURE OF TIRES.

1,393,998.   Specification of Letters Patent.   Patented Oct. 18, 1921.

Application filed November 20, 1919. Serial No. 339,454.

*To all whom it may concern:*

Be it known that I, WILLIAM H. FULTON, a citizen of the United States of America, residing at Irvington, in the county of Essex and State of New Jersey, have invented certain new and useful Improvements in the Manufacture of Tires, of which the following is a full, clear, and exact description.

In the manufacture of "shoes" or casings for pneumatic tires it is necessary that the casing be under pressure during vulcanization, and for this purpose two methods are in common use. In one, used chiefly with so-called fabric tires, the tire casing is filled by a rigid form or core and is pressed firmly thereon by an external mold. In the other method, used chiefly with so-called cord tires, the casing is inclosed in an outer mold and pressure is exerted on the inside by means of an inner elastic air bag into which air is forced under pressure. The latter method produces the best results, but is high in labor cost and also in cost of the air-bag used, which rapidly deteriorates under the high temperature of vulcanization and so becomes useless when it has been used a few times. I have therefore been led to devise my present invention, which has for its chief object to provide a method and apparatus by which internal fluid pressure (preferably air pressure) can be employed without the use of an internal container or air-bag, thus producing tires of high grade and at the same time eliminating a large item of cost. To this and other ends the invention consists in the novel procedure and apparatus hereinafter described.

Referring now to the accompanying drawings.

Figure 2:
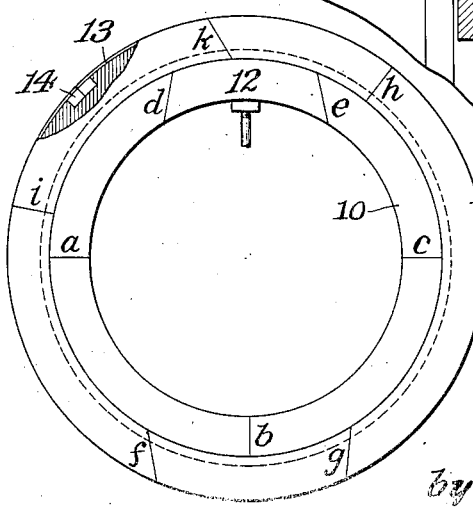
Fig. 2 is a side view of the core, on a smaller scale, showing a convenient method of making the same collapsible so that it can be removed from the finished casing.

The annular inner core or form is composed of an inner part 10 and an outer part 11, having, when assembled, an outer contour corresponding to the contour desired for the inside of the tire. Both parts are made in sections so that they can be withdrawn from the finished tire. For example they may be constructed as indicated in Fig. 2. In this figure the inner part is divided on three radial planes $a$, $b$, $c$, and on two planes $d$, $e$, which converge outwardly to form an outwardly tapering wedge-shaped section 12. The outer part 11 is divided on two outwardly converging planes $f$, $g$, on two radial planes $h$, $i$, and a non-radial plane $k$.

Figure 1:
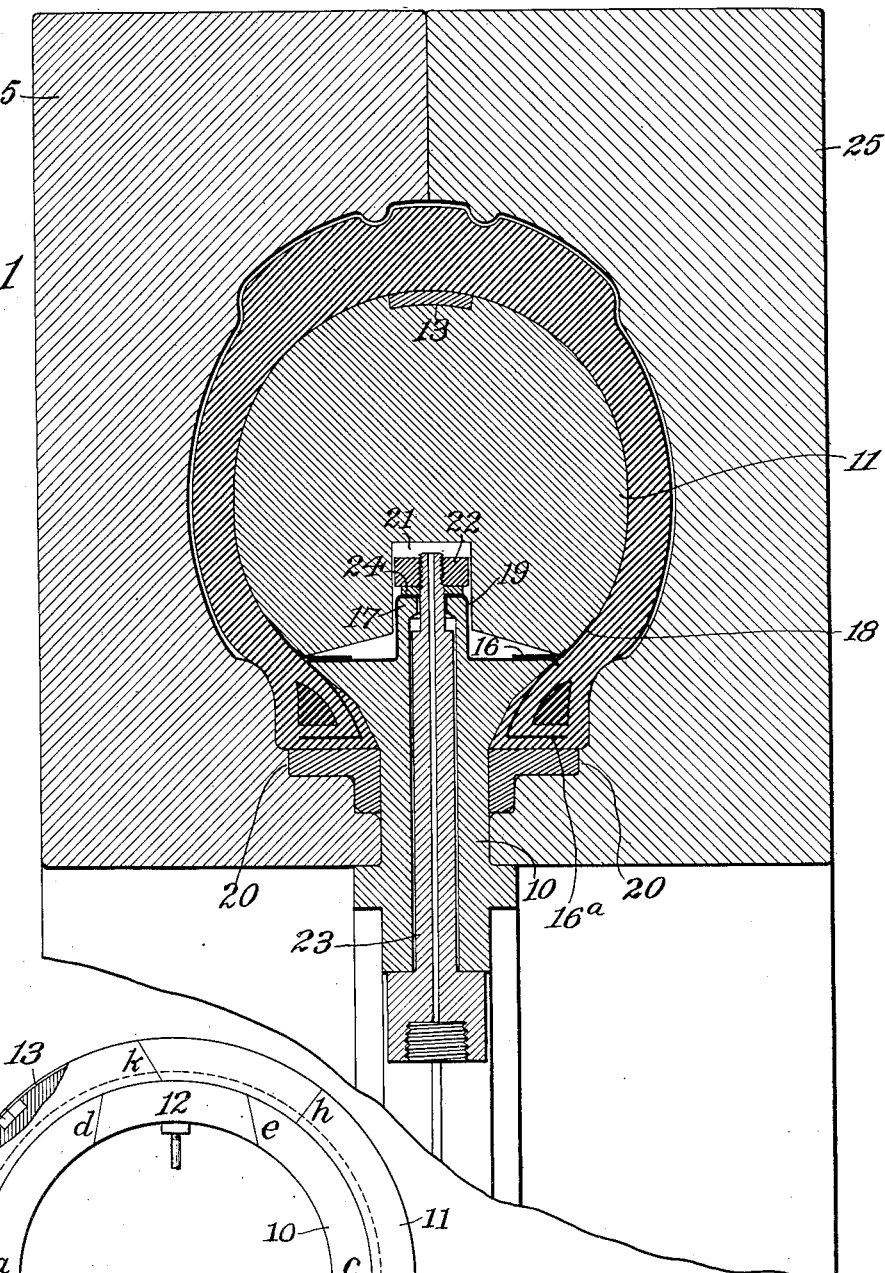
Figure 1 is a cross section of the inner core and outer form with a tire casing between the two, ready for vulcanization.

In making the tire the inner part 10 of the core or form is first assembled on the usual support, commonly known as the "buck," not shown. On the outer surface of the inner core-part 10 I now place a circumferential strip of fabric 16 of suitable width, which is fitted down around the circumferential rib 17. The sides of the strip (which in Fig. 1 are shown at 16$^a$, embedded in the tire beads) at this stage lie parallel to the sides of the inner core-part. At least the outer surface of the strip is coated with unvulcanized rubber, but preferably both sides are coated, in which case the adjoining surface of the iron core is "doped" to prevent adherence of the strip to permit the latter to slip to a slight extent. Two circumferential side-strips of fabric 18, coated with unvulcanized rubber on the surfaces which face radially inward, are now pressed snugly upon the strip 16 at the sides of the inner core-part, but overhanging the latter as indicated. The outer core part is next assembled, with its inner circumferential groove 19 fitted over the fabric-covered rib 17, and the entire structure is then locked together by means of a band 13 of spring metal seated in a circumferential groove in the outer core-part and having its ends provided with lugs 14, Fig. 2, to snap into suitable recesses.

The tire-casing is now built up on the form, in the course of which operation the sides 16$^a$ of the inner strip 16 are folded up so as to be embedded in the beads as indicated, after which two heavy angle-rings 20, the outer diameter of which is the inner diameter of the completed casing, are placed inside the beads and against the sides of the inner core-part, as shown.

The groove 19 has at any suitable point a polygonal recess 21 to fit over a nut 22 of similar shape on the end of the tubular stem 23 by which the nut is drawn down firmly upon the gasket or washer 24. It will of course be understood that these parts are assembled before the outer core-part is assembled.

The tire having been built up, the two-part outer mold 25 or form is fitted over the whole, as indicated, and its parts are held in firm contact with each other and with the rings 20 by any convenient means, as by bolts, not shown, or preferably, by hydraulic pressure in the usual way. In forming the tire, the beads are made large, so that they will be powerfully compressed against the contiguous surfaces of the rings 20, the core 10, and the mold-parts 25; but elsewhere the tire is made too small to fill the mold.

The tubular stem or bolt 23 is now connected to a source of compressed air. The latter, passing into the groove 19, finds its way between the core-parts 10, 11, to the adjoining edges of the same, and thence between the strips 18 and the inner core-part 11, and between the latter and the inner surface of the tire, thereby forcing the latter outwardly against the mold and putting the cords, or fabric, as the case may be, under tension. I prefer at first to have the internal air pressure about the same as that of the steam during vulcanization, and then (the mold being in the vulcanizing chamber) increase the internal pressure, before actual vulcanization begins, to a suitable point, depending upon the size of the tire, its construction (whether cord or fabric), etc., to insure having its carcass under adequate tension. As the inner pressure expands the tire the strip 16 can, if necessary, slip outwardly on the inner core-part, the fold at the bottom of the rib 17 pulling away from the latter into the space between the outer surface of the inner core-part and the adjacent concave surface of outer part.

After vulcanization is completed, the outer mold 25, rings 20, and stem 23 are removed. The tire beads are then sprung out and the fabric strip 16 is cut around the core-part 10 on each side at the juncture of the strip with the tire. Section 12 of the inner core-part is now removed inwardly and the other sections, thus freed, are taken out, after which the outer part is removed in the same manner, followed by the ring 13, which is "peeled" out of the tire.

The purpose of the strips 16 and 18 is to provide a seal between the tire bead and the inner core-part 10 at the outer edges of the latter, to prevent escape of air at such point and thereby compel the air to pass up between the tire and the outer core-part, it being understood that the strips 16 and 18 adhere hermetically to each other and that the strips 18 adhere hermetically to the inner surface of the tire. In some cases a seal is not needed, the close contact of the bead and the bare surface of the core being sufficient, but to be on the safe side I prefer to provide a special seal at such point. The strip 16 also serves to seal the joints between the sections of the inner core-part 10, and so far as this function is concerned it may be omitted when a solid core-part is used.

From the foregoing it will be seen that the tire is formed, or built up, on a rigid core and that the latter remains in place during vulcanization, but during the latter stage of the process the tire is held out against the mold, with the embedded layers of fabric or cords under tension, by the fluid-pressure between the core and the tire. This tension straightens out any wrinkles or other irregularities that may have been produced in building up the tire, and thus eliminates what is a fruitful source of defects in the manufacture of tires by the so-called "full mold" process, in which the tire is compressed upon the core by the outer mold. My process also effects a substantial saving in the cost of the tires, for it avoids the use of air-bags, which are expensive and subject to rapid deterioration. Moreover air-bags sometimes burst during vulcanization, thereby ruining the tire or seriously impairing its quality. My process effects a further saving in that it eliminates the time and labor heretofore involved in removing the core on which the tire is formed and substituting the air-bag,—operations requiring great care and skill, inasmuch as the unvulcanized tire has comparatively little tensile strength and is therefore easily distorted beyond the permissible limits.

It is to be understood that the invention is not limited to the exact procedure herein specifically described but can be practised in other ways without departure from its spirit.

I claim:

1. In the manufacture of tires, the improvement which consists in forming the tire on an inner core, adhesively sealing the base of the tire to the core, inclosing the tire with the core inside of it in a suitable mold, and forcing air under pressure between the tire and the core to press the tire outwardly against the mold and maintain the tire under tension during vulcanization.

2. In the manufacture of tires, the improvement which consists in forming the tire on an inner core and adhesively sealing the tire to the core near the beads, inclosing the tire with the core inside of it in a suitable mold, and forcing air under pressure between the tire and the core beyond the seal to press the tire outwardly against the mold and maintain the tire under tension during vulcanization.

3. In the manufacture of tires, the improvement which consists in placing circumferentially on the outer surface of an annular sectional inner core-part an impervious strip of fabric to seal the joints between the sections of the core-part, arranging an annular outer core-part on the inner core-part, forming a tire on the core composed of the two core-parts, adhesively sealing the base of the tire to the core, inclosing the tire with the core inside of it in a suitable mold, and forcing air between the core and the tire to press the tire outwardly against the mold and maintain the tire under tension during vulcanization.

4. In the manufacture of tires, the improvement which consists in forming the tire on an inner core, adhesively sealing the base of the tire to the core, arranging a bead-ring under the tire-beads to confine and shape the latter, inclosing the tire with the core inside of it in a suitable mold, and forcing air between the core and the tire to press latter outwardly against the mold and maintain it under tension during vulcanization.

5. In the manufacture of tires, the improvement which consists in arranging circumferentially around an inner annular core-part at the sides thereof a pair of impervious strips of fabric with their sides overhanging the sides of the core-part, arranging an outer core-part on the outside of the inner core-part, forming a tire on the core composed of the two core-parts with said strips adhering to the inner surface of the tire, inclosing the tire with the core inside of it in a suitable mold, and forcing air between the tire and the outer core-part to press the tire outwardly against the mold and maintain it under tension during vulcanization.

6. In the manufacture of tires, the improvement which consists in placing on the outer surface of an annular sectional inner core-part a strip of rubberized fabric with its sides overhanging the sides of the core-part and extending radially inward, securing to the said strip at the sides of the inner core-part a pair of rubberized strips of fabric with their sides overhanging the core-part and extending radially outward, arranging on the inner core-part and outer sectional core-part, forming a tire on the core composed of the two core-parts and incorporating with the beads of the tire the overhanging sides of the first-mentioned strip, and with the overhanging sides of the said pair of strips adhering to the inner surface of the tire, inclosing the tire with the core inside of it, and forcing air between the core-parts whereby air under pressure is caused to pass between the outer core-part and the said pair of strips and thence between the outer core-part and the tire to press the latter outwardly against the mold and maintain it under tension during vulcanization.

7. In the manufacture of tires, the improvement which consists in forming a tire on an annular core composed of inner and outer parts and adhesively sealing the joints between the inner core-parts and the tire, inclosing the tire with the core inside of it in a suitable mold, and forcing air between the outer core-part and the tire to press the latter outwardly against the mold and maintain it under tension during vulcanization.

In testimony whereof I hereunto affix my signature.

WILLIAM H. FULTON.